(12) United States Patent
Dize

(10) Patent No.: US 7,497,179 B2
(45) Date of Patent: Mar. 3, 2009

(54) QUADRAPOD AIR ASSISTED CATAMARAN BOAT OR VESSEL

(75) Inventor: Andrew P. Dize, Baltimore, MD (US)

(73) Assignee: Global Maritime Solutions, Key Largo, FL (US)

( * ) Notice: Subject to any disclaimer, the term of this patent is extended or adjusted under 35 U.S.C. 154(b) by 0 days.

(21) Appl. No.: 11/901,422

(22) Filed: Sep. 17, 2007

(65) Prior Publication Data

US 2008/0066673 A1   Mar. 20, 2008

Related U.S. Application Data

(60) Provisional application No. 60/845,017, filed on Sep. 15, 2006.

(51) Int. Cl.
*B63B 1/00* (2006.01)
*B63B 1/38* (2006.01)
*B63B 1/32* (2006.01)

(52) U.S. Cl. .............. 114/61.1; 114/67 A; 114/271; 114/291

(58) Field of Classification Search ............. 114/56.1, 114/61.1, 61.12, 61.2, 61.32, 61.33, 65 R, 114/67 R, 67 A, 271, 283, 288–292
See application file for complete search history.

(56) References Cited

U.S. PATENT DOCUMENTS 3,085,536 A * 4/1963 Teetor ................. 114/271
4,996,935 A * 3/1991 Takeuchi .............. 114/61.2
5,570,650 A * 11/1996 Harley ................. 114/61.2
7,168,381 B2 * 1/2007 Cobb et al. ............ 114/61.2

* cited by examiner

*Primary Examiner*—Lars A Olson
*Assistant Examiner*—Daniel V Venne
(74) *Attorney, Agent, or Firm*—Philip M. Weiss; Weiss & Weiss

(57) ABSTRACT

A twin-hull catamaran boat or vessel comprising of four hydrodynamic pod sections connected with a mid-span recess on each hull that receives mechanically inducted gas or air for hull support. Each hull shape of the twin-hull catamaran configuration contains one V-shaped hull portion forward (bow), one mid-length hull cavity portion that receives pressurized gas or air therein (amidships), and one V-shaped hull portion aft (stern). The V-shaped bow portion creates hydrodynamic lift, the air or gas mechanically pressurized mid-length recess portion creates an air cushion to lift the hull in order to reduce wetted surface and drag on the hulls, and the V-shaped stern portion provides hydrodynamic lift to support the aft portion of the twin-hull catamaran configuration and also to provide an aft sealing body for the mechanically pressurized air or gas mid-length cavity. The benefit of the hull configuration as described herein results in lower resistance and uses less horsepower to attain a specific boat or vessel speed.

9 Claims, 5 Drawing Sheets

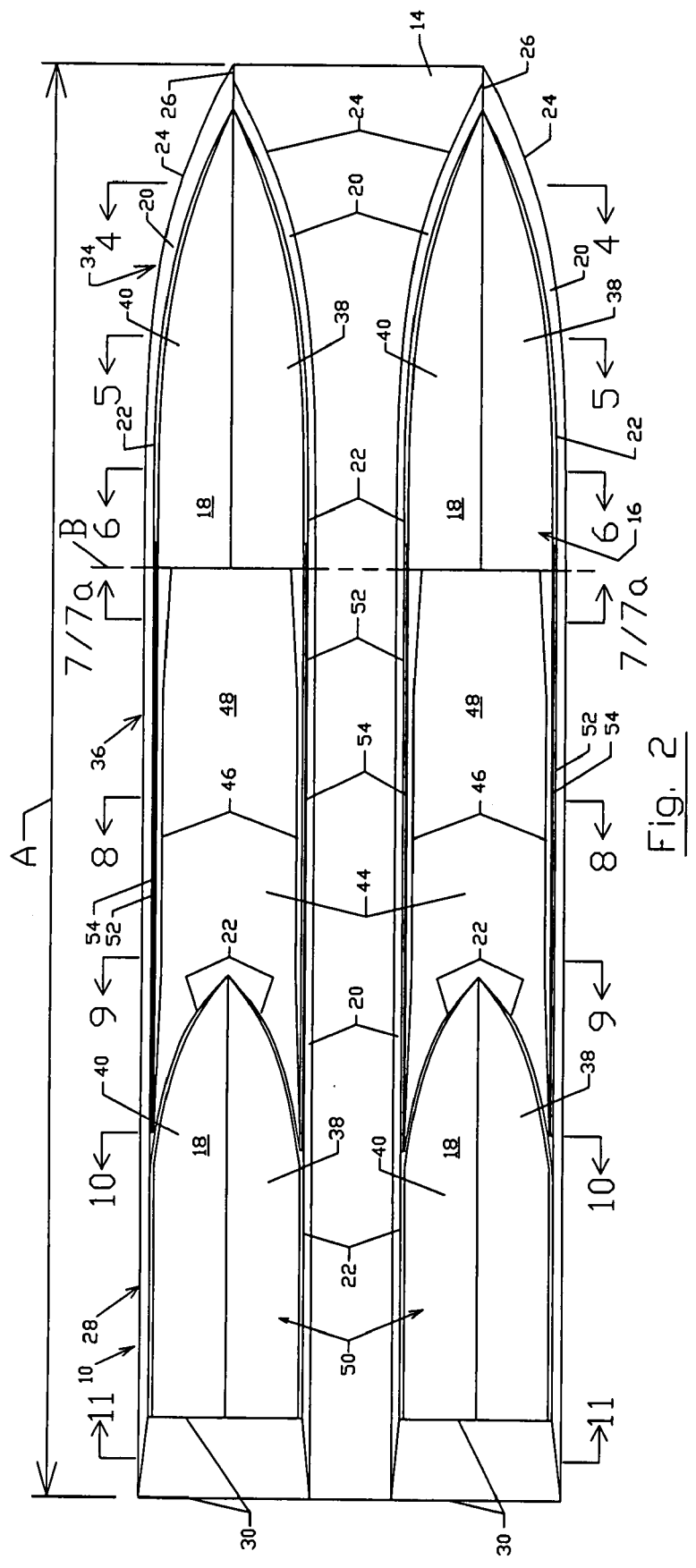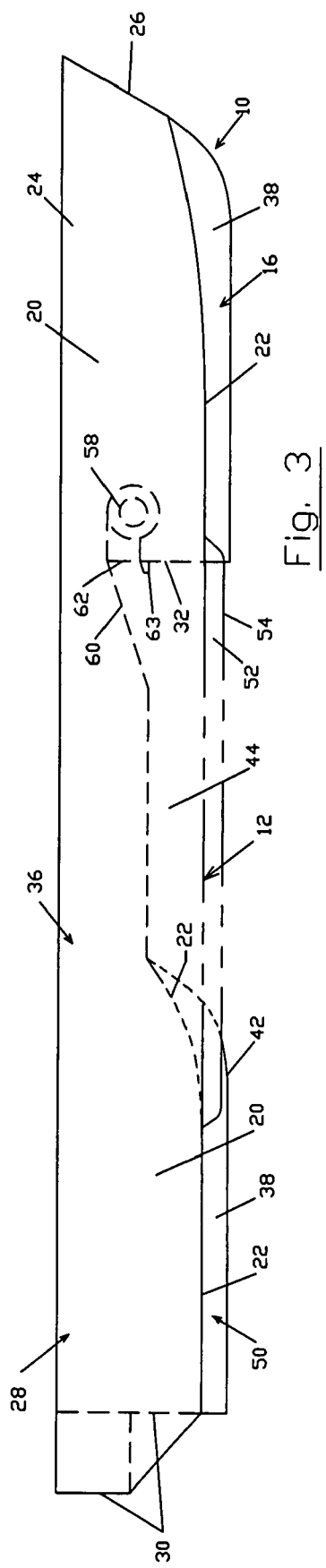

QUADRAPOD AIR ASSISTED CATAMARAN BOAT OR VESSEL

RELATED APPLICATIONS

This application claims priority to U.S. Provisional Patent Application Ser. No. 60/845,017 filed Sep. 15, 2006.

BACKGROUND OF THE INVENTION

1. Field of the Invention

The present invention relates to marine boats or vessel hulls utilizing a conventional twin-hull catamaran boat or vessel configuration with a mid-length cavity wherein pressurized air or gas is mechanically induced to provide vessel lift for reduction of total water drag on the hull, thereby reducing the power levels required to attain a specific design speed. This in-turn allows for a reduction of power levels for a given speed thereby reducing the fuel consumption of the designated propulsion units.

2. Description of the Prior Art

The primary objective in boat or vessel design is to reduce the amount of drag caused by the interaction of the hull with the water surface. Planing hulls are designed so that forward motion of the hull raises the vessel to cause it to ride on a smaller portion of its hull surface resulting in reduced hull-to-water friction. The design of hydrofoil vessels further reduced hull contact with the water by attaching foils to lift the hull surface above the water surface at high speed. Some marine vessels inject a film of air between the vessel's hull and the water to reduce the hull-to-water friction. One example is illustrated in U.S. Pat. No. 3,191,572 issued to H. A. Wilson in which a tri-hulled vessel has air introduced along the bottom of each hull. This air is allowed to stream freely from the stern of the vessel. U.S. Pat. No. 4,031,841 issued to Bredt also discloses the technology for an air film hull. The Bredt and Wilson hulls still ride with the hull relatively low in the water so that much of the sides of the hulls maintain contact with the water, but the drag between a portion of the bottom is somewhat reduced by a film of air mixed with water.

Surface effect ships were an improvement over the air film hulls as the hulls of surface effect ships are raised out of the water by a pressurized air cushion that is partially captured within the hull of the vessel. The prior art of air cushion vessel hull designs include the Harley patent (U.S. Pat. No. 5,570,612) which eliminated the use of flexible seals to contain the air cushion, but this prior art did not properly dispose of the pressurized air cushion to allow for the use of water jet propulsors. The use of water jet propulsors is a critical element for the application of high speed ferry designs in debris-filled waterways. Prior to that, surface effect ships contained the air cushion with flexible seals, which are a rubberized curtain, either all around the vessel as in the case of the hovercraft air cushioned vessels, or across the front and the back of the vessel with thin parallel side hulls that provide a side seal for the air cushion as in the case of surface effect ships. The flexible seals reduce the amount of air lost from the air cushion but create a rough ride even in smooth water. As the surface of the water becomes rougher the flexible seals can be separated from each other. Also, in rough water the flexible seals frequently fail to maintain the air cushion, causing the craft's hull to drop lower into the water until the seal is regained and the air cushion is reestablished. The loss of the air cushion increases the hull contact with the water increasing the hull-to-water friction and significantly slowing the vessel. Seals are a high maintenance problem with frequent breakage that results in permanent loss of air cushion and a slow ride to the repair yard. Such surface effect ships are disclosed by U.S. Pat. Nos. 5,415,120, and 4,392,445 issued to Donald E. Burg and U.S. Pat. No. 4,523,536 issued to Mark H. Smoot.

Notwithstanding the existence of such prior art for surface ships, it remains clear that there is a need for a vessel which will maintain a relatively smooth ride and maintain the air cushion whether the water is smooth or rough without the use of flexible seals. Also, there is a need to improve the stability of surface effect ships which are notoriously unstable in rough water, and enable the introduction of water jet propulsors to minimize damage caused by debris to conventional propeller driven propulsion systems.

SUMMARY OF THE INVENTION

The present invention relates primarily to a twin-hull catamaran shape with a pair of forward and aft buoyancy/hydrodynamic hull sections with a mid-length hull section that has a cavity to mechanically induce gas or air to provide an efficient, stable, smooth, high speed ride. The quadra-pod air assisted catamaran boat or vessel hull comprises two symmetrical hulls joined by a transverse deck surface. Each hull comprises a bottom, having an exterior surface; and opposing sides, having first and second ends, attached to the bottom and extending upwardly there from, the sides curving inwardly and joining together at the first end to form a bow and being connected together at the second end by a transversely extending transom or step, a generally planar surface, extending inwardly from the bottom generally perpendicular to the longitudinal dimension so that a plane defined by a step separates each catamaran hull into three parts, a bow portion extending forward of the step, an air cavity portion extending rearward of the step, and an aft hull portion extending from the aft end of the air cavity portion to the transom of the vessel.

The bow portion of the bottom comprises a port face and a starboard face that are joined together to form a convex V-shape that extends from proximal the bow to the step. The apex of the V-shape defines the keel of the bow portion. The bow portion of the bottom may also possess an appendage for wave-piercing capability depending on the sea state and speed the hull is to be designed for. The port and starboard face each define an angle with a horizontal plane defined as the dead rise angle of the hull. A cross section of the hull generally perpendicular to the longitudinal dimension defines a dead rise angle that lies within a range of 45 degrees to 65 degrees. The dead rise angle decreases rearward aft to no less than 15 degrees as defined by the intersection between the step and the bottom of the bow portion.

The mid-length portion of each catamaran hull has a cavity formed therein, the cavity extending rearward from the step of the bow portion, to the intersection with the aft hull portion at the intersection of the aft hull portion and the chine's, and inwardly from the exterior surface of the sides. The top portion of the cavity is formed by a horizontal plane parallel to the keel. A pressurized air generation means that is well known in the art is connected in fluid flow communication with the air cushion cavity to provide hull lift.

The aft portion of the bottom comprises a port face and a starboard face that are joined together to form a convex V-shape that extends longitudinally from the bow of the aft portion to the transom. The apex of the V-shape defines the keel of the bow of the aft portion. The first and second face each defines an angle with a horizontal plane defined as the dead rise angle of the hull. A cross section of the hull generally perpendicular to the longitudinal dimension defines a dead rise angle that lies within a range of 45 degrees to 75 degrees. The dead rise angle running aft decreases to no less than 20 degrees as defined by the intersection between the transom and the bottom of the aft hull portion.

Fins or skegs are incorporated between the forward and aft hull sections on each side of each hull at each chine to guide the water flow under the boat or vessel to retain air within the cavity portion of the hull. The enclosure of the air cavity allows air or gas to mechanically be induced to create a pressure that will lift the vessel in order to reduce the resistance of the forward and aft hull sections thereby reducing the amount of power required to drive the design at a specified speed. The end of each fin at the terminus with the intersection of the aft hull with the chine allows the air to be released from the cavity in a way as to prevent interaction with water jet propulsors and also to reduce the wake generated by the boat or vessel hull.

The invention accordingly comprises an article of manufacture possessing the features, properties, and the relation of elements which will be exemplified in the article herein-after described, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings, in which:

FIG. 2 is a bottom plan view of the invention of FIG. 1.

FIG. 3 is a centerline elevation view of one of the quadra-pod hulls.

Similar reference characters refer to similar parts throughout the several views of the drawings.

DETAILED DESCRIPTION

Figure 1:
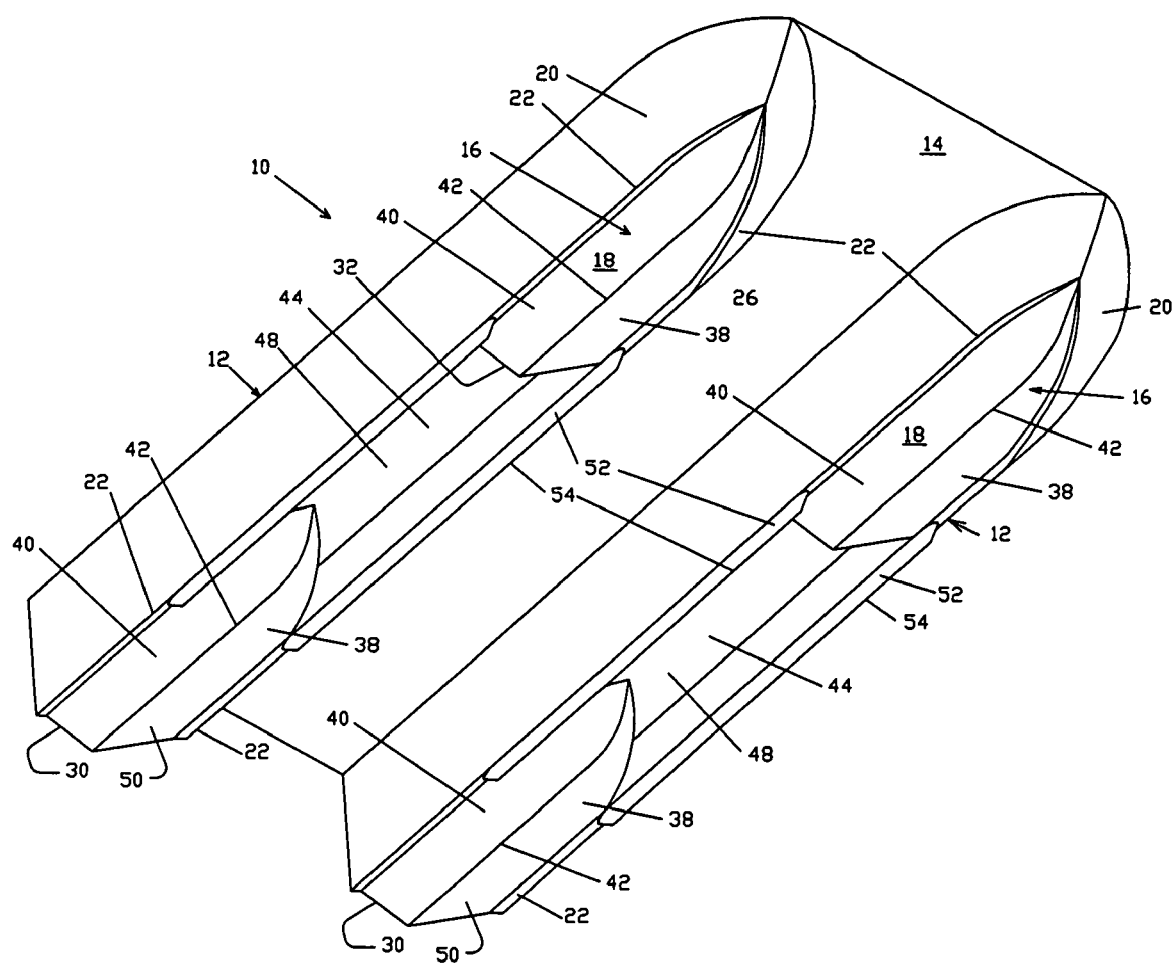
FIG. 1 is a perspective view of the quadra-pod air assist catamaran boat or vessel hull of this invention.
Figure 4:
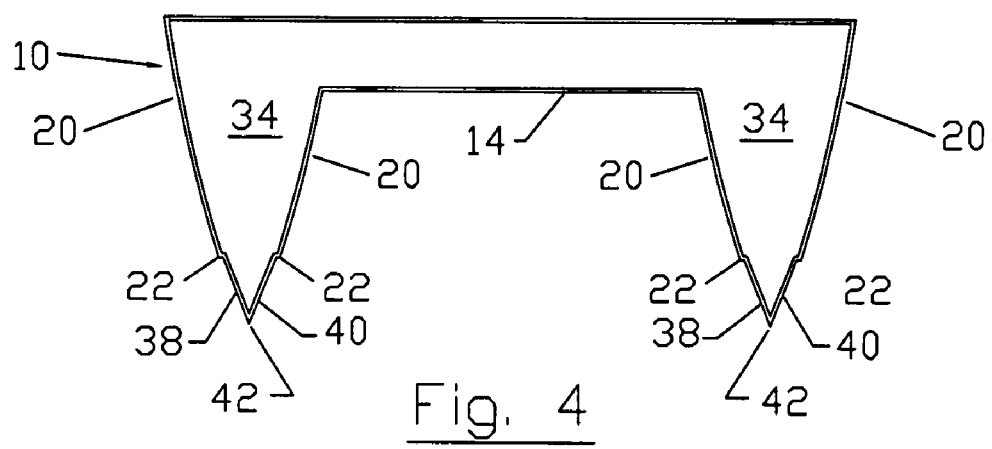
FIG. 4 is a sectional elevation view taken along line 4-4 of FIG. 2.

A preferred embodiment for the quadra-pod hull is illustrated in the drawing FIGS. 1-11 in which the vessel is generally indicated as 10. Referring first to FIG. 1 it can be seen that the vessel hull 10 comprises a pair of catamaran hulls 12 that are joined to one another by a deck or cross structure 14.

As shown in FIG. 2, each catamaran hull has a longitudinal dimension, and comprises a bottom 16, that has exterior surfaces 18, a pair of opposing sides 20 that are attached to the bottom 16 and extend upwardly there from. For the purposes of this specification, the chine 22 defines the line of attachment of the sides 20 to the bottom 16. The first ends 24 of each side 20 are joined to form the bow 26, the second mid-length sections 36, and the third ends 28 are connected to one another by a transom 30 that extend transversely there between. A step 32, extends inwardly from the bottom 12, which can be seen most clearly in FIGS. 3 and 7, extends inwardly from the bottom 12, generally perpendicular to the longitudinal dimension.

As seen in FIG. 2, the step 32 lies in a plane B that defines a bow portion 34 extending forwardly, including the bow 26, and an air cushion portion 36 extending rearward of said plane to intersect the aft hull portion 50 that extends rearward of said plane to the transom 30. In the preferred embodiment the bow section 34 comprises 30 to 35 percent of the overall length of the vessel from the bow 24 to the transom 30, the air cushion portion comprises 30 to 35 percent of the overall length of the vessel from the bow 24 to the transom 30, and the aft portion 28 comprises 30 to 35 percent of the overall length of the vessel from the bow 24 to the transom 30.

Figure 5:
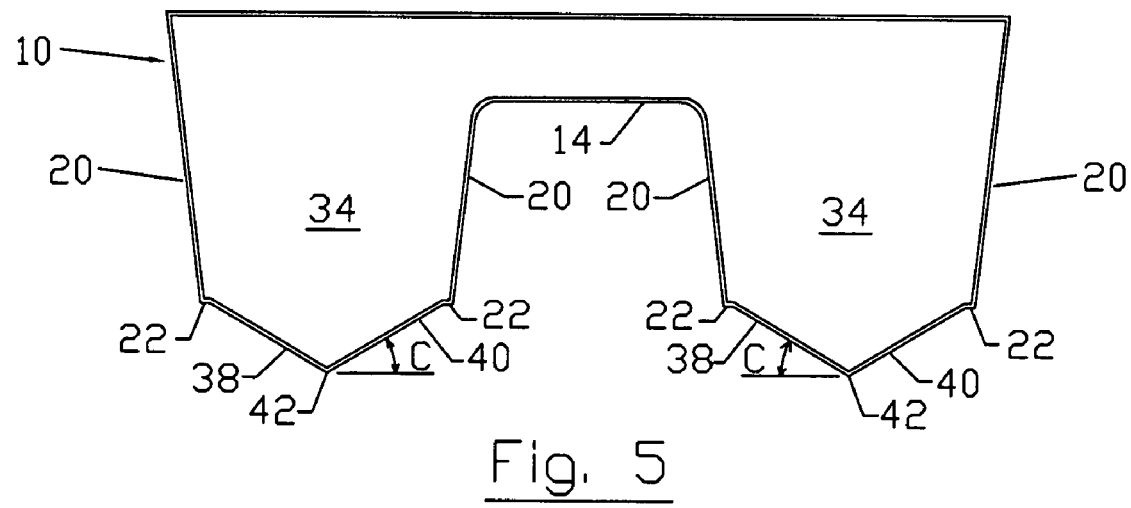
FIG. 5 is a sectional elevation view taken along line 5-5 of FIG. 2.
Figure 6:
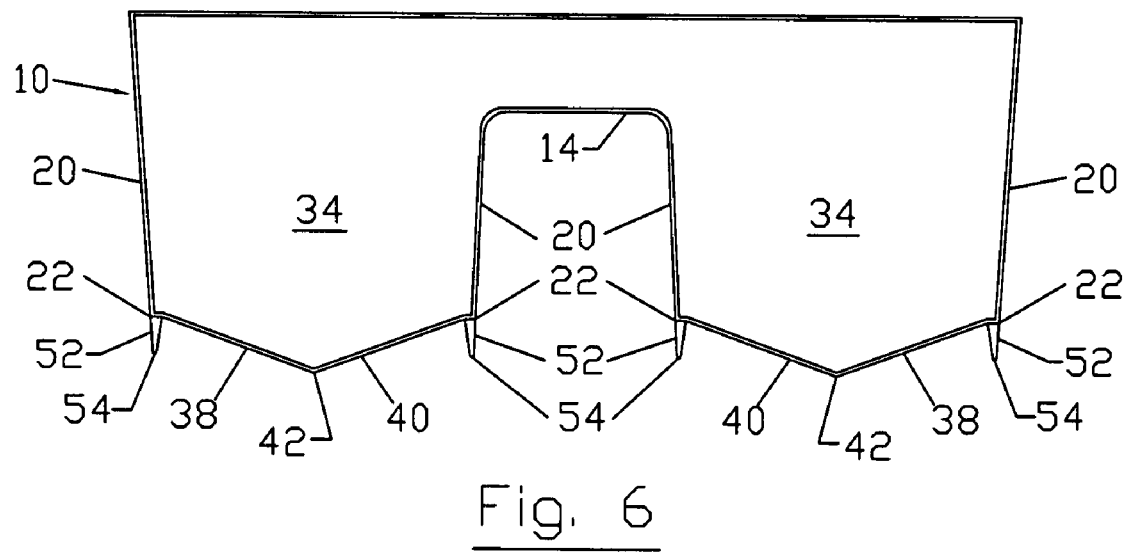
FIG. 6 is a sectional elevation view taken along line 6-6 of FIG. 2.

The bow portion 34 of the bottom 16 comprises a first face 38 and a second face 40 that are joined at the keel 42 to form a convex V-shape. Each face, 38 and 40, forms a dead rise angle, C, with a horizontal plane. At a cross section of the bottom 16 proximal the bow 26, as shown in FIG. 5, the angle C is preferably 55 degrees, however in other embodiments the angle C proximal to the bow 25 may lie within the range of 45 degrees to 65 degrees and still function satisfactorily. In a preferred embodiment, the angle C gradually decreases to no less than 15 degrees at the step 32.

Figure 8:
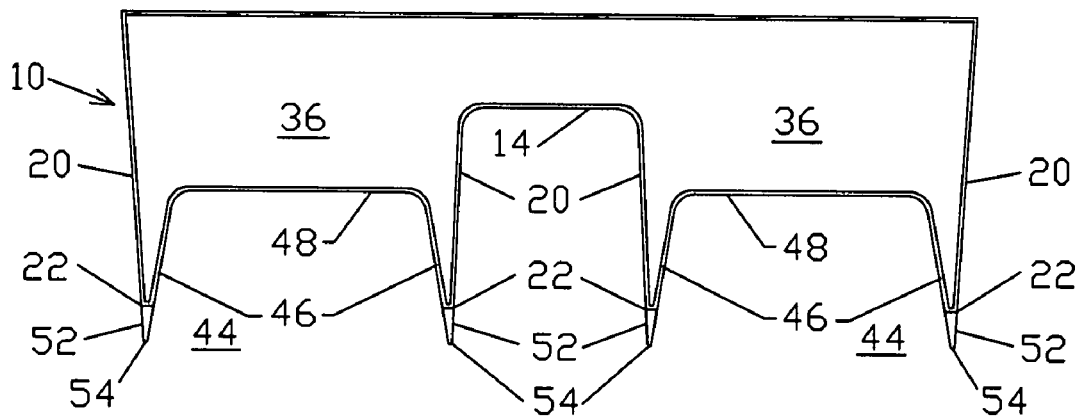
FIG. 8 is a sectional elevation view taken along line 8-8 of FIG. 2.
Figure 9:
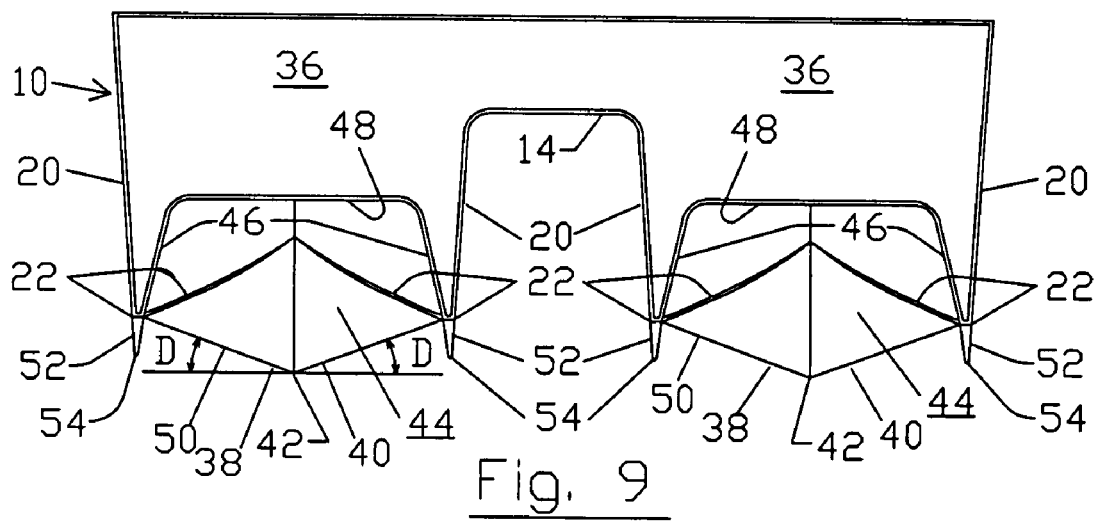
FIG. 9 is a sectional elevation view taken along line 9-9 of FIG. 2.
Figure 10:
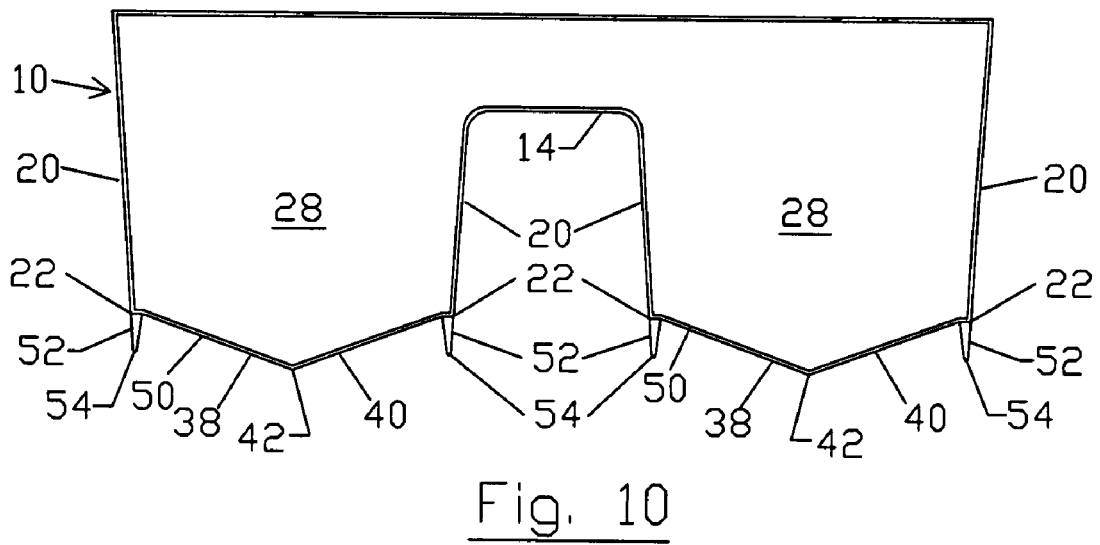
FIG. 10 is a sectional elevation view taken along line 10-10 of FIG. 2.
Figure 11:
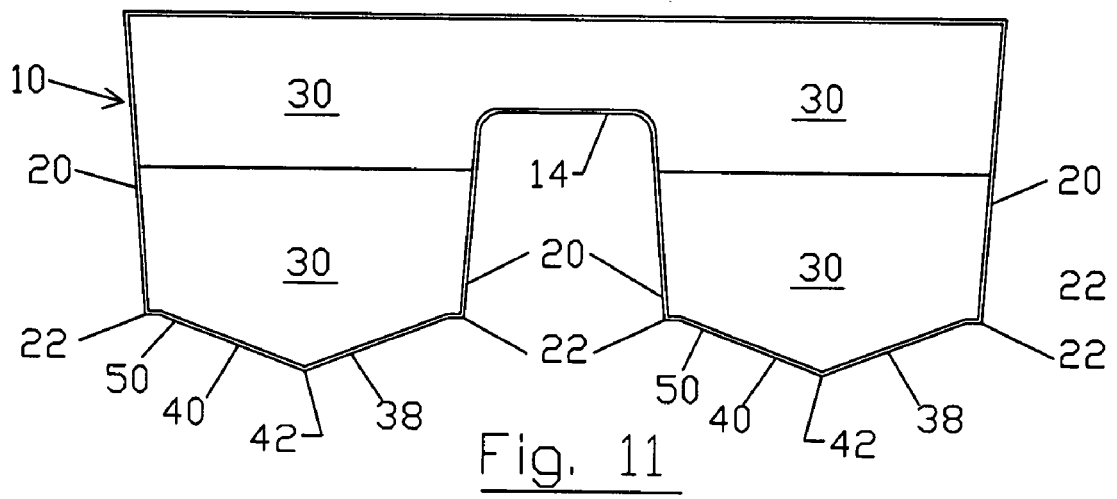
FIG. 11 is a sectional elevation view taken along line 11-11 of FIG. 2.

The air cushion portion 36 of the hull 10 has an air cushion cavity 44 formed therein that extends rearward from the step 32 to proximal the aft hull portion 50. The recess 44 is bounded by the step 32 at the forward end, sloping cavity side surfaces 46, the aft hull surfaces 50, and the top of the cavity 48. In other embodiments, the air cushion cavity 44 may comprise many different shapes that are well known in the art. The shape shown in FIGS. 8 and 9 is but one example of a shape that works effectively. In a preferred embodiment, the length of the air cushion cavity 44 is greater than the transverse width as measured between the fins 52 at right angles to the longitudinal dimension A.

The aft hull portion 50 of the bottom 16 comprises a first face 38 and a second face 40 that are joined at the keel 42 to form a convex V-shape. Each face, 38 and 40, forms a dead rise angle, D, with a horizontal plane. At a cross section of the bottom 16 proximal the aft hull portion, as shown in FIG. 9, the angle D is preferably 55 degrees, however in other embodiments the angle D proximal to the bow 26 may lie within the range of 45 degrees to 75 degrees and still function satisfactorily. In a preferred embodiment, the angle D gradually decreases to no less than 20 degrees at the transom 30.

In a preferred embodiment, the fins 52 extend from a point forward of the step 32 on the chine surface 22 of the bow portion 34, onto the chine surface 22 of the mid-length portion 36, and ending at the intersection of the aft hull portion 50 and the chine surface 22. The starting point of the fins 52 is forward of the step 32 that lies within the range of 3 percent to 10 percent of the overall longitudinal dimension of the vessel 10. In a preferred embodiment, the fins 52 extend 30 to 35 percent of the overall longitudinal length of the vessel 10. For example, on a 100 foot long vessel the fins 52 will extend 1 foot forward of the step 32 and extend to 6 inches forward of the intersection of each chine 22 on the aft hull portion 50. The vertical extent of the fins 52 extends one-half to 1 percent of the overall length of the fins 22, from the bottom surface 18, e.g., approximately 6 to 12 inches for a vessel 10 having a 100 foot longitudinal dimension.

The portion of each fin 52 that is distal the boat 10 comprises a fin keel portion 54. The fin keel portions 54 of each fin 52 lie generally in the same plane with one another and generally in the same plane as a portion of the keel 42 of the bow portion of the hull 10 that is proximal to the step 32 and the intersection of the aft hull portion 50 at the chine surface 22.

Figure 7:
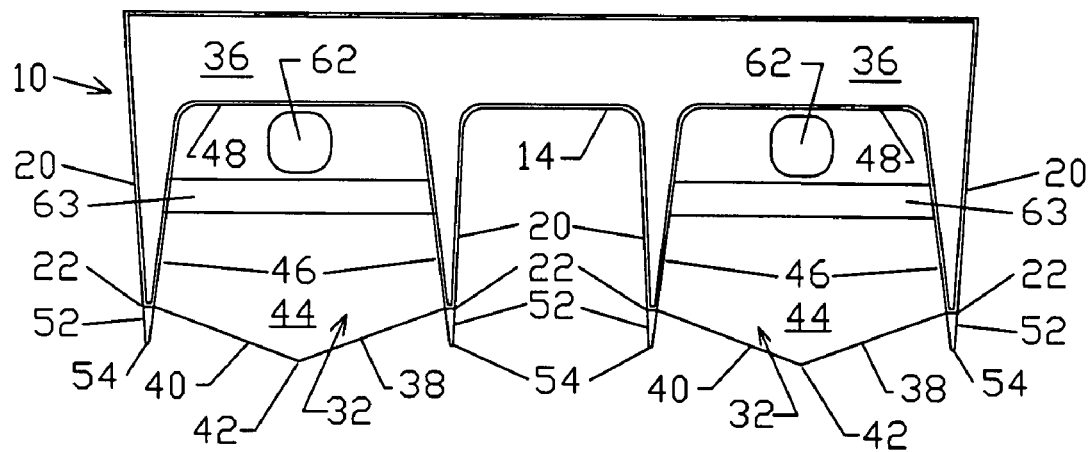
FIG. 7 is a sectional elevation view taken along line 7-7 of FIG. 2.
Figure 7A:
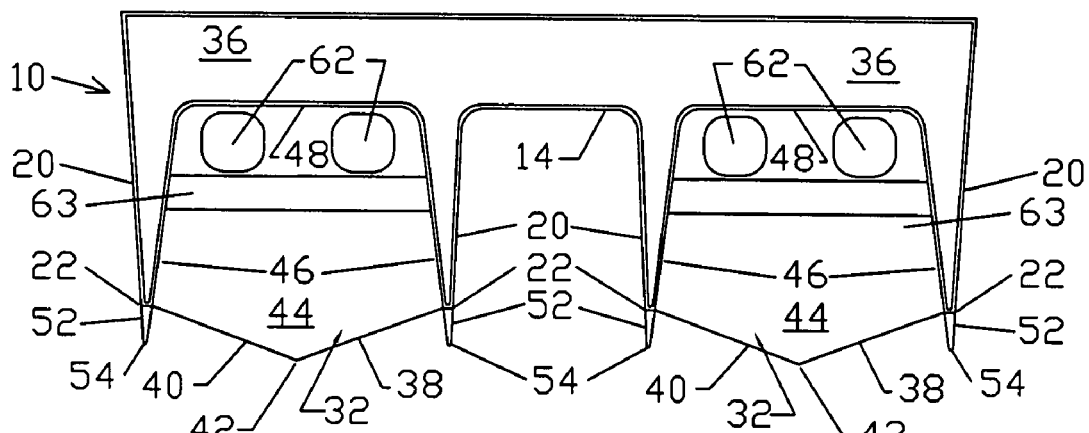
FIG. 7a is a sectional elevation view taken along line 7-7 of FIG. 2.

A pressurized air generation means, shown generally as 58 is preferably mounted within the vessel 10 and is connected by ducting 60 to outlets 62 formed in the top of 48 and the cavity 44. Devices 58 for supplying air under pressure are well known in the art of surface effect ship design and may be provided as single unit for each hull as shown in FIGS. 3 and 7, or multiple units as shown in FIG. 7a in each hull may be used as connected by ducting 60 to outlets 62 in the top of 48 and the cavity 44. The devices may be operated by their own motors or may be operated by power take-offs from other motors on the vessel 10. To assist in the direction of flow of pressurized air injected into the cavity, an air dam 63 is provided to prevent the backflow of water into the fan outlet (s) 62 or ducting 60. The vertical location of the air dam is proximal to the horizontal level with the top of 48 in the cavity 44.

The quadra-pod air assist hull 10 may be constructed of fiber glass, synthetic resins, composites, aluminum, steel, or any other material or combination of materials that are suitable for the purpose. Boats or ships constructed using the quadra-pod hull design disclosed may use any drive method including standard outboard motors for smaller boats and larger inboard gas or diesel engines or turbine engines for large vessels.

Having thus set forth a preferred construction for the quadra-pod hull 10 of this invention, it is to be remembered that this is but a preferred embodiment. Attention is not invited to a description of the use of quadra-pod hull 10. Certainly many different super structures may be constructed on the hull 10 depending on the use for which the vessel is intended, including but not limited to racing craft, pleasure yachts, and for freight and/or passenger transport.

The quadra-pod hull 10 discussed below is discussed in relation to a hull 10 that has no restriction on an overall longitudinal dimension. Various size hulls 10 may be constructed with generally proportional dimensions, however, these dimensions may be adjusted depending upon the specific use that is intended for the vessel utilizing the quadra-pod hull 10. The quadra-pod hull 10 does not incorporate any flexible seals, thereby eliminating the historical problems associated with a conventional surface-effect craft, a rough ride, high maintenance, control problems, high hump drag (meaning ships with flexible seals are hard to get up on the cushion, to get over the hump, which takes a lot of power that is not necessary when the vessel is on the cushion). The quadra-pods hull 10 is a catamaran with twin hulls that each has a mid-length cavity portion 36 that is approximately 30 to 35 percent of the overall length. Each hull 12 has a bow portion 34 that comprises approximately 30 to 35 percent of the overall longitudinal dimension and an aft portion 28 that consists of a 30 to 35 percent of the overall vessel length.

The bow portion 34 of each catamaran hull 12 has a V-bottom 16 with a sharp entry proximal the bow 26, a dead rise of approximately 55 degrees, the dead rise is reduced to no less than 15 degrees proximal the step 32, easily creating dynamic lift as the vessel's speed increases so that the vessel easily begins to plane, as boats without air cushions have operated for years. The bow portion 34 is designed to deflect the approaching waves both downward and sideways in a progressive manner over a substantial part of the craft's length.

The water passing beneath the air cavity is consequently modified to be essentially horizontal, even when the quadra-pod hull 10 is operating in significant seas. The advantages of this design, which modifies the flow of the approaching waves before they reach the air cavity portions 36 of each catamaran hull 12, are considerable. Flexible seals used by conventional surface effect ships are unnecessary, eliminating the high maintenance costs and down time required for repair of flexible seals. Without the modification of the waves to essentially a horizontal configuration, the waves strike the flexible seals of conventional quadra-pod ships causing reduction in cushion volume and variations in the cushion pressure creating additional lift power requirements, and along with bow slamming are the primary factors that can result in a rough ride. The bow portion 34 of the each catamaran hull 12 greatly reduces pitching and spray compared with a conventional surface effect ship.

By elimination of the mid-length hull volume with a cavity and mechanically inducing pressurized gas or air into a cavity, the total hull drag is greatly reduced as the air cavity portion 36 of the quadra-pod hull 10 lifts the hull out of the water and significantly reduces the wetted surface of the vessel. The pressurized air cavity, which creates air platform lift over the mid-length area of the hulls 12 dramatically reduces hull resistance and improves intact stability. This combination of hydrodynamic lift and air platform lift to create a highly efficient vessel hull form not previously obtained in prior boat and ship hull designs. Therefore the quadra-pod hull 10 combines both hydrodynamic lift from movement of the vessel through the water as well as dynamic lift with lift from a pressurized air cavity, making it easy for the vessel to reach and maintain plane and yet significantly reduces the drag on the hulls 12 and in-turn reduces required engine power and fuel consumption.

Use of twin hulls 12, each with a separate pressurized air cushion increases intact stability without appreciably increasing the drag. The separated hulls and separated air cushions create a large roll-restoring force which produces a quadra-pod vessel that is not center-of-gravity sensitive. Stiffness and damping in roll are greatly increased because each air cushion acts on the cushion separation arm to provide roll stability. Twin hulls 12 also increase the efficiency of performance at all speeds compared with the design of prior art single cushion surface effect ships that are only designed for efficiency at one speed. Performance improvements also result from air cushion cavities that are greater in length longitudinally rather than transversely which in conjunction with the interconnection geometry of the catamaran hull shapes 10, chines 22, and skegs 52 prevent the loss of pressurized air to provide lift of the hull form.

Placement of the air cavity 44 too far forward reduces the dynamic lift and exposes the air cushion cavity 44, which would then require the use of a flexible curtain as in the prior art conventional surface effect ships. Placing the air cushion cavity 44 too close to the bow 26 would increase the drag appreciably. A 30 to 35 percent bow portion 34 combined with a 30 to 35 percent air cavity portion 36 and a 30 to 35 percent stern portion 28 has been found to be a preferred embodiment for the quadra-pod hull 10.

The mid-length hull air cavity 44 must be protected so that water does not enter the air cavity 44 or an unacceptable amount of air escape forward or aft. The sharp entry of the bow portion 34 that gradually reduces to a dead rise of not less than 15 degrees deflects the approaching waves both downward and sideways and modifies the water flow as it approaches the air cavity 44 to relatively horizontal flow. The fins 52 that extend slightly forward of the air cavity 44 and aft to the aft hull portions 50 intersection with the chine surfaces 22 direct small portions of air to the sides which allows the aft hull portions 50 to be fully immersed. The flow of water directed by movement of the boat or vessel between the fins 52 forms the bottom portion of the air cavity 44 which allows mechanically induced gas or air to be trapped to lift the boat or vessel resulting in reduced resistance/drag of the bow and aft hull portions of the catamaran hulls. The immersion of the aft hull portions free of air intrusion allows for the use of water jet propulsors.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the claims asserted are intended to cover all of the generic and specific features of the invention herein described, and all statements of the scope of the invention which, as a matter of language, might be said to fall there between.

What is claimed:

1. A quadra-pod twin-hull catamaran boat or vessel comprising;
   two catamaran hulls joined transversally and longitudinally by a deck, each catamaran hull defining a longitudinal dimension;
   each said catamaran hull comprising a bottom in a fore section of the hull having an exterior surface, opposing sides attached to said bottom and extending upwardly therefrom and a transom connecting said sides and being attached to and extending upwardly from said bottom, a step extending inwardly from said bottom generally perpendicular to said longitudinal dimension, said step lying in a plane passing through said hull generally transverse to said longitudinal dimension defining a bow hull portion extending forward of said plane and a recessed portion extending rearward of said plane, with an aft hull portion having an exterior surface, opposing sides attached to said bottom and extending upwardly there from and a transom connecting said sides and being attached to and extending upwardly from said bottom;
   said bow hull portion of each said catamaran hull bottom comprising a port face and a starboard face joined to form a V-shape that extends from proximal said bow to said step, a line formed by said port face and said starboard face of said bow hull portion defining a keel of a bow of said bow hull portion, said port face and said starboard face of said bow hull portion each defining an angle with a horizontal plane passing through said keel, said angle at a cross-section proximal said bow is at least 55 degrees, said angle diminishing to no less than 15 degrees at said step;
   a mid-length hull portion of each said catamaran hull having an air cavity formed therein, said air cavity extending rearward from said step of the bow hull portion to proximal with the aft hull portion, with in-sloping side surfaces and a top wherein air can be mechanically induced into the air cavity to provide lift;
   said aft hull portion of each said catamaran hull bottom comprising a port face and a starboard face joined to form a V-shape that extends from proximal a bow of said aft hull portion to said transom, a line formed by said port face and said starboard face of said aft hull portion defining a keel of a bow of said aft hull portion, said port face and said starboard face of said aft hull portion each defining an angle with a horizontal plane passing through said keel, said angle at a cross-section proximal said bow is at least 55 degrees, said angle diminishing to no less than 20 degrees or less at said transom.

2. A quadra-pod boat or vessel hull as in claim 1 wherein said bow hull portion of each catamaran hull has a longitudinal dimension from said bow of said bow hull portion to said step of said bow hull portion the bow hull portion that extends between 30 to 35 percent of the longitudinal length of said catamaran hull.

3. A quadra-pod boat or vessel hull as in claim 1, wherein said angle at the bow hull portion diminishes from at least 55 degrees proximal said bow of said bow hull portion to no less than 15 degrees or less at said step of the bow hull portion.

4. A quadra-pod boat or vessel hull as in claim 1 wherein said mid-length hull portion of each said catamaran hull extends between 30 to 35 percent of the longitudinal length of said catamaran hull having an air cavity section formed therein, said air cavity extending rearward from said bow hull portion to proximal with the aft hull portion, with in-sloping side surfaces and a top wherein air can be mechanically induced into the air cavity to provide lift.

5. A quadra-pod boat or vessel hull as in claim 1 further comprising port and starboard fins (or skeg) on each catamaran hull extending downwardly between each bow hull portion, each fin extending from proximal said step of said bow hull portion to a point just aft of said aft hull portion at an intersection of a chine with said air cavity, said point being at a distance from said step that lies within a range of 30 percent to 35 percent of an overall longitudinal dimension of said vessel; and a depth of each fin (or skeg) is equal to or less than a depth of a height of said chine above a hull centerline keel baseline.

6. A quadra-pod boat or vessel hull as in claim 5, wherein each said fin (or skeg) comprises a keel portion, said keel portion of each said catamaran hull section lies generally in the same plane with one another and generally in the same plane as the keel of said bow hull portion, aft hull portion and mid-length hull portion of each catamaran hull.

7. A quadra-pod boat or vessel hull as in claim 1 wherein said aft hull portion of each said catamaran hull has a longitudinal dimension extending from said air cavity to said transom that extends between 30 to 35 percent of a longitudinal length of said catamaran hull.

8. A quadra-pod boat or vessel hull as in claim 1, wherein said angle at the aft hull portion diminishes from at least 55 degrees proximal said bow of said aft hull portion to no less than 20 degrees or less at said transom.

9. A quadra-pod boat or vessel hull as in claim 1 comprising catamaran hulls as defined herein having longitudinal axes parallel to one another and said catamaran hulls being spaced apart from one another.

* * * * *